US009247572B2

(12) United States Patent
Bynum et al.

(10) Patent No.: US 9,247,572 B2
(45) Date of Patent: Jan. 26, 2016

(54) INTELLIGENT WIRELESS CHARGING DEVICE

(71) Applicant: Intel Corporation, Santa Clara, CA (US)

(72) Inventors: Michael R. Bynum, Portland, OR (US); Saurin Shah, Portland, OR (US); Lakshman Krishnamurthy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/142,833

(22) Filed: Dec. 28, 2013

(65) Prior Publication Data

US 2015/0189683 A1 Jul. 2, 2015

(51) Int. Cl.
| | |
|---|---|
| *H04B 1/38* | (2015.01) |
| *H04W 76/02* | (2009.01) |
| *G06F 1/16* | (2006.01) |
| *H04M 1/725* | (2006.01) |
| *H04M 1/73* | (2006.01) |
| *H02J 7/00* | (2006.01) |
| *H04M 1/60* | (2006.01) |

(52) U.S. Cl.
CPC ............ *H04W 76/023* (2013.01); *G06F 1/1632* (2013.01); *H02J 7/00* (2013.01); *H04M 1/6041* (2013.01); *H04M 1/72519* (2013.01); *H04M 1/72522* (2013.01); *H04M 1/73* (2013.01); *H04M 1/6066* (2013.01)

(58) Field of Classification Search
CPC ....... H04L 65/403; H04L 67/14; H04L 67/24; H04W 76/02; H04W 36/14; H04W 4/02; H04W 40/02; H04W 84/005; G08G 1/205; H04M 1/725; H04M 1/7253; H04M 2250/02; G01S 19/14; G01S 1/026; G01S 1/028
USPC ......................................................... 455/557
See application file for complete search history.

(56) References Cited

U.S. PATENT DOCUMENTS

| | | | |
|---|---|---|---|
| 2011/0084807 A1* | 4/2011 | Logan et al. .................. | 340/10.1 |
| 2013/0282937 A1 | 10/2013 | Chapman | |
| 2013/0294617 A1 | 11/2013 | Alberth, Jr. | |
| 2014/0106734 A1* | 4/2014 | Lee ............................... | 455/419 |

FOREIGN PATENT DOCUMENTS

KR 10-2012-0107391 A 1/2012

OTHER PUBLICATIONS

International Search Report and Written Opinion received for International Patent Application No. PCT/US2014/067310, mailed on Mar. 6, 2015.

* cited by examiner

*Primary Examiner* — Kwashi Karikari
(74) *Attorney, Agent, or Firm* — Alpine Technology Law Group LLC (57) ABSTRACT

In one example a base station for an electronic device comprises a charging station, an audio interface, logic, at least partially including hardware logic, configured to detect a first electronic device within a geographic region proximate the charging device, and in response to detecting the first electronic device 100, to establish a communication link with the first electronic device via a wireless communication channel, activate the audio interface to receive audio input. Other examples may be described.

18 Claims, 10 Drawing Sheets

INTELLIGENT WIRELESS CHARGING DEVICE

RELATED APPLICATIONS

None.

BACKGROUND

The subject matter described herein relates generally to the field of electronic devices and more particularly to an intelligent base station for electronic devices.

Many electronic devices such as laptop computers, netbook style computers, tablet computers, mobile phones, electronic readers, and the like have communication capabilities, e.g., voice and text messaging, built into the devices. In some circumstances it may be useful to communicate with such electronic devices using an interface on ancillary electronic devices such as headsets, computer-equipped glasses, or the like. Such ancillary electronic devices tend to be compact, have limited battery power, and therefore require frequent recharging, during which time they are not useful.

Accordingly additional systems and techniques to provide for intelligent ancillary electronic devices may find utility.

BRIEF DESCRIPTION OF THE DRAWINGS

The detailed description is described with reference to the accompanying figures.

DETAILED DESCRIPTION

Described herein are exemplary systems and methods to implement an intelligent base station for electronic devices. In the following description, numerous specific details are set forth to provide a thorough understanding of various examples. However, it will be understood by those skilled in the art that the various examples may be practiced without the specific details. In other instances, well-known methods, procedures, components, and circuits have not been illustrated or described in detail so as not to obscure the particular examples.

Briefly, the subject matter described here addresses concerns set forth above at least in part by providing a base station for an electronic device. In a first example, the base station for an electronic device includes a charging station which may be used to charge the power store of the electronic device. Further, the base station includes an audio interface and logic which enables a user to continue interacting with the electronic device while the electronic device is charging. For example, the logic may detect when an electronic device is proximate the base station and may then establish a communication link with the electronic device over a wireless communication channel and may activate the audio interface on the base station to enable a user to communicate with the electronic device via the audio interface. Thus, the base station enables the user to continue interacting with the electronic device while the electronic device is charging. For example, an ancillary electronic device such as a headset or earpiece may be placed in the charging station and a user may continue to interact with the ancillary electronic device through the audio interface on the base station.

In another example the base station includes an RF transceiver which provides an interface to one or more networks. Further, the base station includes an audio interface and logic which enables a user to continue interacting with the electronic device while the electronic device is charging. For example, the logic may detect when an electronic device is proximate the base station and may then establish a communication link with the electronic device over a wireless communication channel and may activate the audio interface on the base station to enable a user to communicate with the electronic device via the audio interface. Thus, the base station enables the user to continue interacting with the electronic device while the electronic device is within range of the base station. For example, the base station may detect an electronic device such as a mobile phone, tablet computer or the like and may override an ancillary electronic device such as a headset or earpiece so that the ancillary electronic device may be placed in a low-power consumption state while the user may continue to interact with the electronic device through the audio interface on the base station.

Specific features and details will be described with reference to FIGS. 1-10, below.

Figure 1:
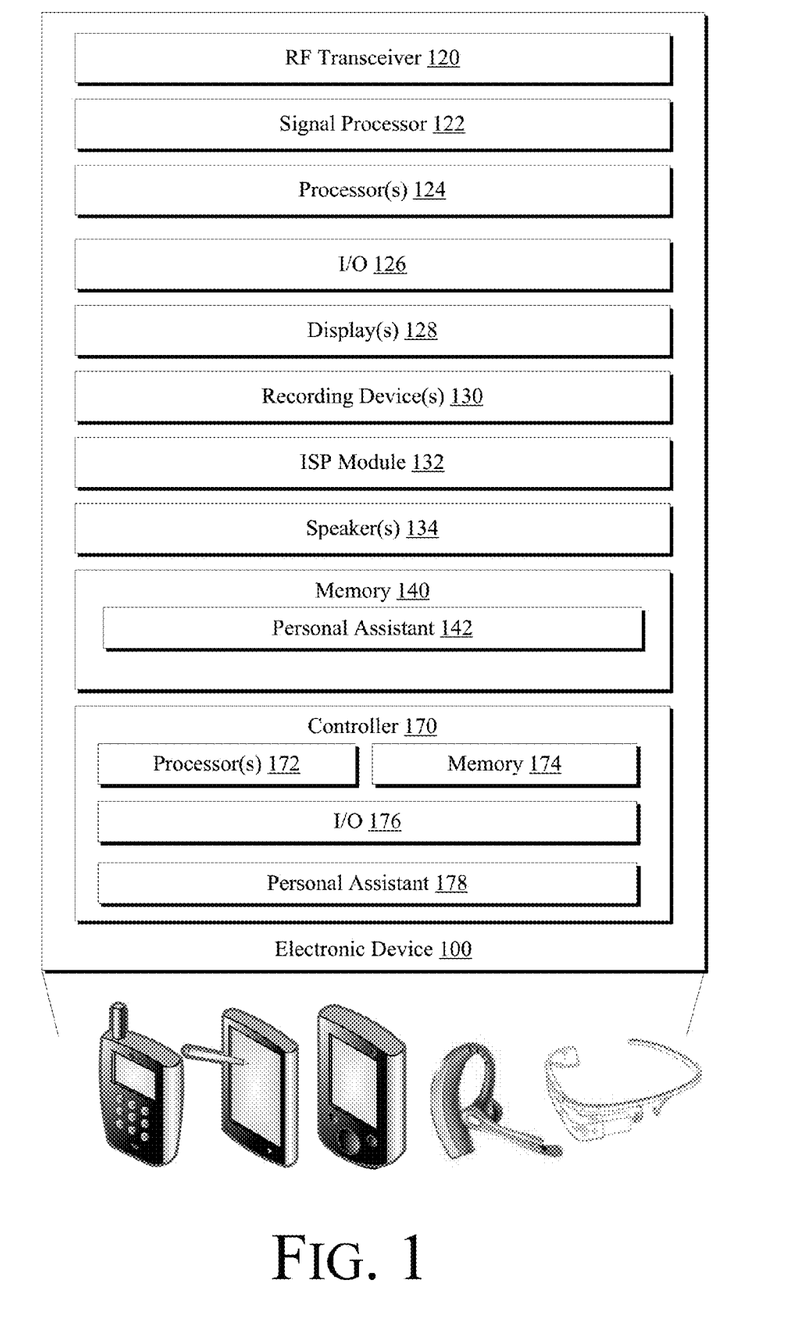
FIG. 1 is a illustrations of exemplary electronic devices which may be adapted to work with intelligent recording in accordance with some examples.

FIG. 1 is a schematic illustration of an example of a electronic device 100. In some aspects electronic device 100 may be embodied as a mobile telephone, a tablet computing device, a personal digital assistant (PDA), a notepad computer, a video camera, a wearable device like a smart watch, smart wrist band, smart headphone, or the like. The specific embodiment of electronic device 100 is not critical.

In some examples electronic device 100 may include an RF transceiver 120 to transceive RF signals and a signal processing module 122 to process signals received by RF transceiver 120. RF transceiver 120 may implement a local wireless connection via a protocol such as, e.g., Bluetooth or 802.11x. IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Electronic device 100 may further include one or more processors 124 and memory 140. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit. In some examples, processor 124 may be one or more processors in the family of processors available from Intel® Corporation of Santa Clara, Calif. Alternatively, other processors may be used, such as Intel's Itanium®, XEON™, ATOM™, and Celeron® processors. Also, one or more processors from other manufactures may be utilized. Moreover, the processors may have a single or multi core design.

In some examples, memory 140 includes random access memory (RAM); however, memory module 140 may be implemented using other memory types such as dynamic RAM (DRAM), synchronous DRAM (SDRAM), and the like. Memory 140 may comprise one or more applications including a personal assistant 142 which execute on the processor(s) 124

Electronic device 100 may further include one or more input/output (I/O) devices 126 such as, e.g., a keypad, touchpad, an audio interface, or the like, and one or more displays 128, speakers 134, and one or more recording devices 130. By way of example, recording device(s) 130 may comprise one or more cameras and/or microphones An image signal processor 132 may be provided to process images collected by recording device(s) 130.

In some examples electronic device 100 may include a low-power controller 170 which may be separate from processor(s) 124, described above. In the example depicted in FIG. 1 the controller 170 comprises one or more processor(s) 172, a memory module 174, and an I/O module 176. In some examples the memory module 174 may comprise a persistent flash memory module and the I/O module 176 may be implemented as logic instructions encoded in the persistent memory module, e.g., firmware or software. The I/O module 176 may comprise a serial I/O module or a parallel I/O module. Again, because the adjunct controller 170 is physically separate from the main processor(s) 124, the controller 170 can operate independently while the processor(s) 124 remains in a low-power consumption state, e.g., a sleep state. Further, the low-power controller 170 may be secure in the sense that the low-power controller 170 is inaccessible to hacking through the operating system.

In some examples an instance of the personal assistant 178 may execute on controller 170. The instance of personal assistant 178 may have the full functionality of the personal assistant 142 in memory 140. In alternate examples the instance of the personal assistant 178 which executes on controller 170 may include only a portion of the functionality of the personal assistant 142 stored in memory 140. For example, the instance of the personal assistant 178 may provide a front-end access service to receive and respond to requests for the personal assistant 142, e.g., when the processor(s) 124 are in a low-power or sleep state. The personal assistant 178 may receive requests for service from the personal assistant 142 and may implement an authentication process to ensure that the requestor is authorized to use the personal assistant 142. For example, the personal assistant 178 may collect a password, match a voice print, or implement another authentication technique. The personal assistant 178 may then wake the processor(s) 124 from a low-power or sleep state and pass the request to personal assistant 142.

Figure 2:
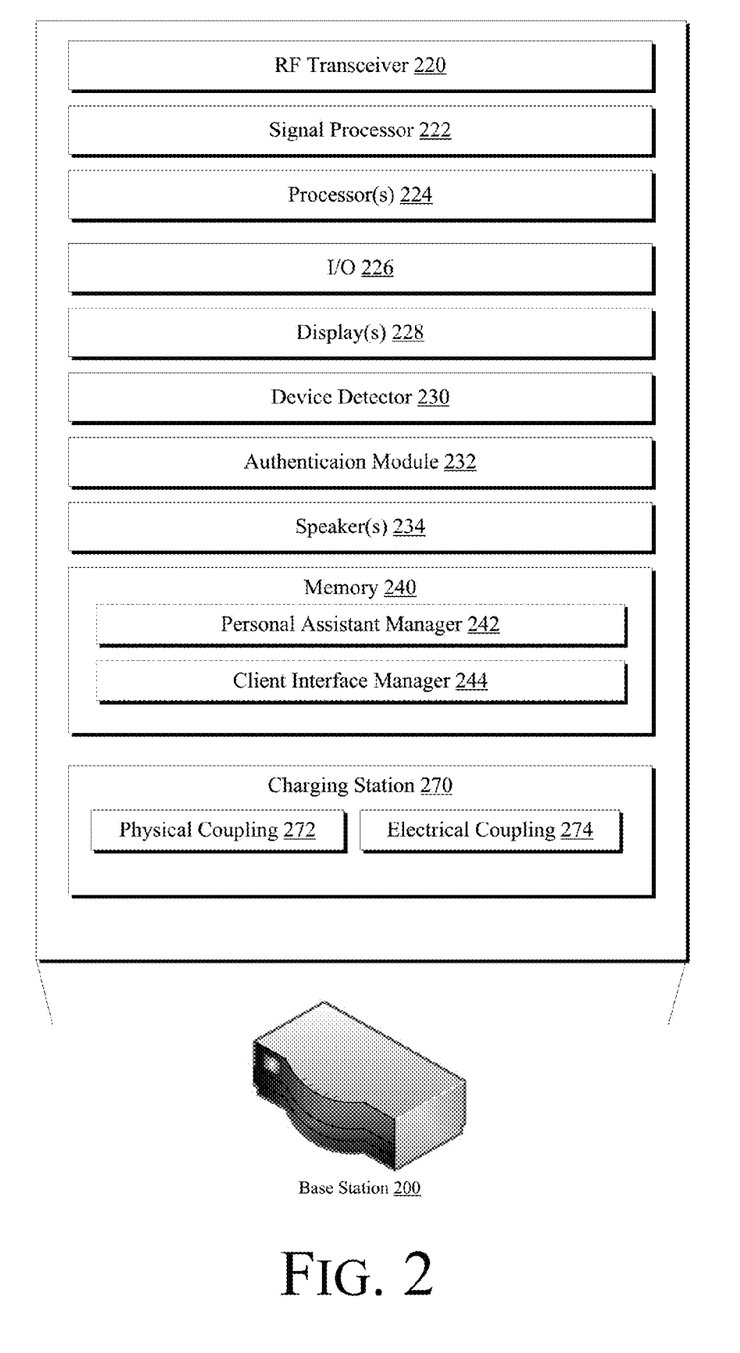
FIG. 2 is a schematic illustration of components of an intelligent base station for electronic devices in accordance with some examples.

FIG. 2 is a schematic illustration of components of a base station 200 in accordance with some examples. Many of the components of base station 200 may be similar to the corresponding components for the electronic device 100 depicted in FIG. 1. In the interest of brevity and clarity, the description of corresponding components will not be repeated. Components of base station 200 which are different are described below.

Referring to FIG. 2, in some examples base station 200 may comprise a device identifier module 230 which includes logic to identify one or more electronic devices 100 that come within range of base station 200. For example, device detector 230 may detect beacon RF signals transmitted by an electronic device 100. In some examples, device detector 230 may include a registration module which enables a user to register an electronic device 100 with the base station 200.

In some examples base station 200 may comprise a personal assistant manager 242 which enables the base station 200 to interact with a personal assistant 142/178 on electronic device. Further, base station 200 may comprise a client interface manager 244 which manages communication with electronic device 100.

The base station 200 depicted in FIG. 2 includes a charging station 270 to enable base station 200 to charge electronic device 100. Charging station 272 comprises a physical coupling 272 and an electrical coupling 274. In some examples the charge station may comprise a wireless charging capability which enables the charging of electronic device 100 without the need for a wired connection between electronic device 100 and base station 200. In such examples the physical coupling 272 may comprise a pad or a bowl to receive electronic device 100 and the electrical coupling 274 may comprise one or more coils arranged to generate an alternating magnetic field which may be used to drive an alternating electrical current in one or more coils in an electronic device 100. In other examples the charging station 200 may comprise a conventional wired charging capability, such that the physical coupling 272 and the electrical coupling 274 are provided by a wire. The specific construction of the charging station 270 is not critical.

Figure 3:
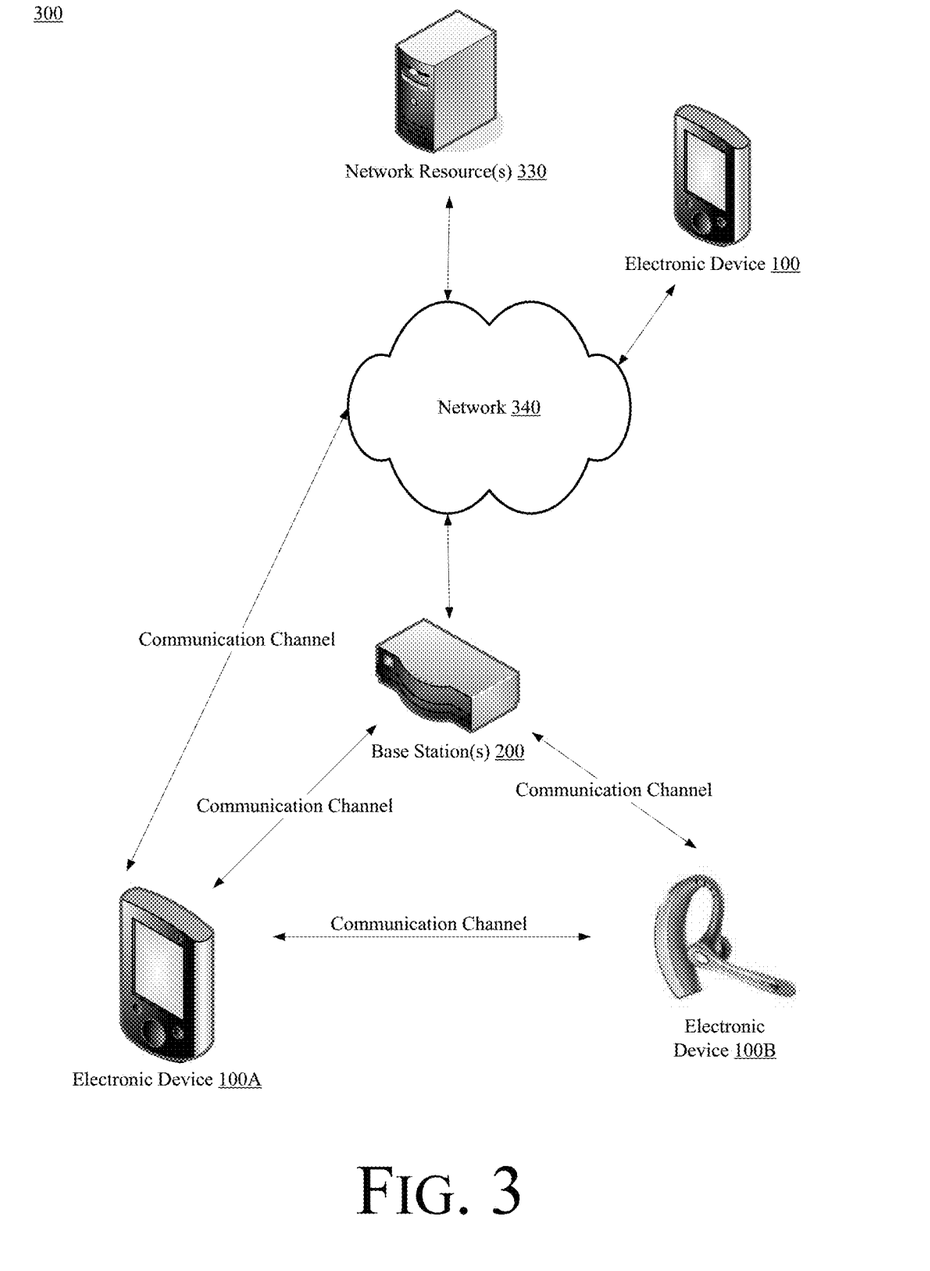
FIG. 3 is a high-level schematic illustration of an environment in which an intelligent base station for electronic devices may be implemented in accordance with some examples.

FIG. 3 is a high-level schematic illustration of an environment in which an intelligent wireless charging device may be implemented in accordance with some examples. Referring to FIG. 3, in some environments an electronic device 100A as described above may be within range to establish a communication channel with one or more ancillary electronic devices 100 via a communication channel (e.g., a Bluetooth channel or the like). Wireless device 100 A may establish a communication channel with a network 340. For example, network(s) 340 may include wireless networks, e.g., wireless local area networks, and one or more public networks such as the Internet.

Electronic device 100A and 100B may establish a communication channel with a base station 200 when within range of base station 200. For example, the communication channel between electronic device 100 and base station 200 may be a wireless communication channel, a wired communication channel, an optical communication channel, or the like.

In some examples base station 200 may be embodied as a network access device (e.g., a router, base station or the like) which provides electronic device 100 with access to one or more network resources 330 or other electronic devices 100C via a communication network(s) 340.

Having described various structures to implement ancillary electronic devices, operating aspects will be explained with reference to FIGS. 4-5, which are flowcharts illustrating operations in a method to implement intelligent base stations for electronic devices.

In a first example the base station 200 includes a charging station 270 and the base station 200 implements operations to enable a user to continue interacting with an electronic device 100 placed in the charging station 270 via an I/O interface 226 such as an audio interface. For example, a user may place an electronic device such as a mobile phone 100A or an earpiece 100B depicted in FIG. 2 in the charging station 270 and may continue to interact with the electronic device 100B via the audio interface of the base station while the device is charging.

Figure 4:
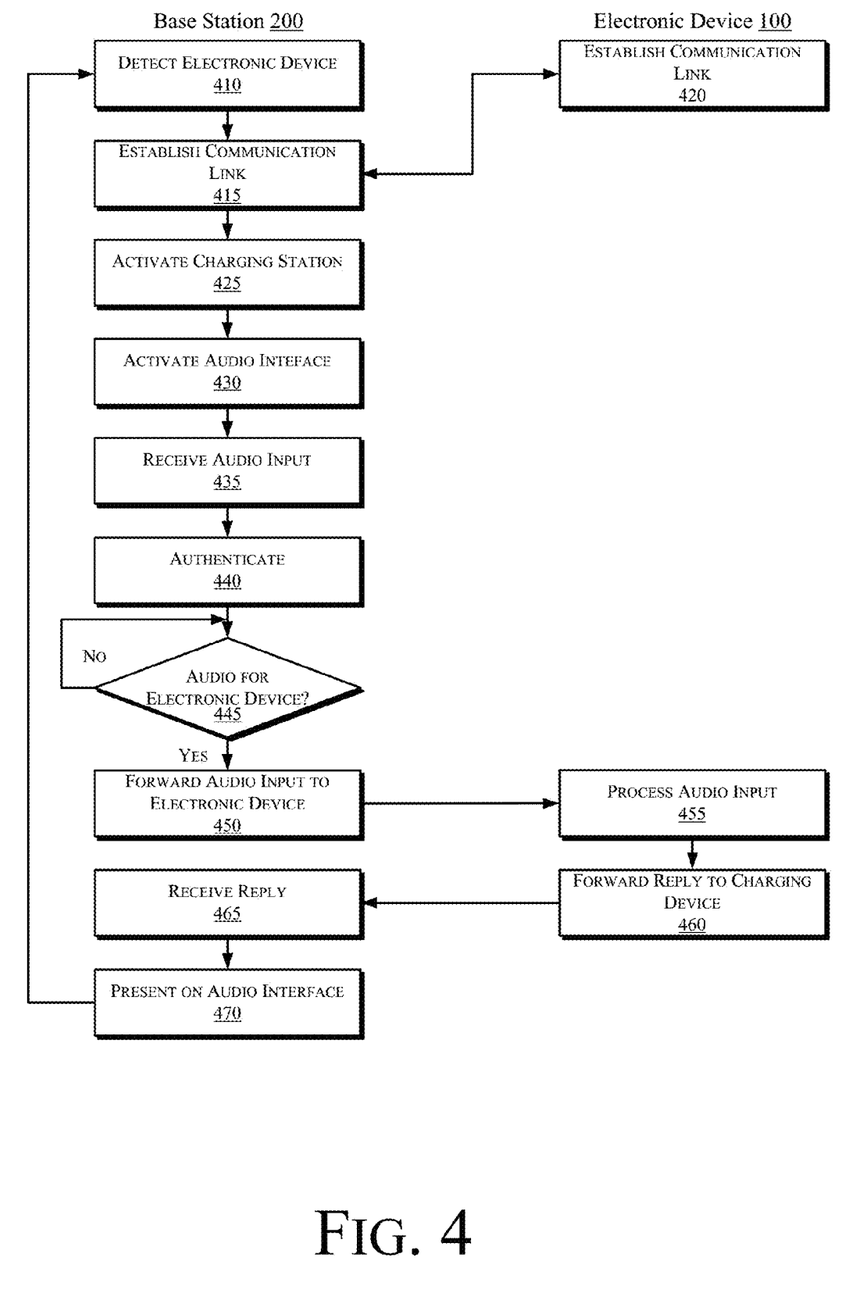
FIGS. 4-5 are flowcharts illustrating operations in a method to implement an intelligent base station for electronic devices in accordance with some examples.

Referring to FIG. 4 at operation 410 the base station 200 detects an electronic device 100 within range of the base station. For example, in some examples the device detector 230 may detect a wireless beacon signal transmitted by electronic device 100. At operation 415 the base station 200 establishes a communication link with electronic device 100, and at operation 420 the electronic device 100 performs operations necessary to establish the communication link. For example, the communication link between base station 200 and electronic device 100 may be established via a wireless communication channel, e.g., a Bluetooth link or the like.

At operation 425 the base station 200 activates the charging station 270, and at operation 430 the base station 430 activates the audio interface of the I/O interface(s) 226. At operation 435 the audio interface receives an audio input. For example, a user of the electronic device may place the electronic device 100 in the charging station and may begin speaking. The audio interface receives the audio input from the user.

At operation 440 the base station 200 authenticates the audio input. For example, the authentication module may implement one or more routines to authenticate the audio input. In a first example, the authentication module 232 may obtain an identifier associated with the electronic device 100 and then may compare a characteristic of the audio input received in operation 435 with a corresponding characteristic of a pre-recorded audio input. For example, the base station 200 may implement a registration process in which a user of an electronic device may input a key phrase (e.g., "Hello Jarvis") to the audio interface. Authentication module 232 may then invoke the services of a voice recognition algorithm to extract and characterize one or more features (e.g., mel-frequency cepstral coefficients) of a voice signal. The extracted features may be stored in association with an identifier of the electronic device 100 in memory 240. Features from the audio input received at operation 435 may then be compared to the features stored in memory to determine whether the user is authenticated.

In another example the authentication module 232 obtains a voice sample from the electronic device 100 and matches the voice sample from the electronic device 100 to the audio input received at operation 435 to authenticate the user. For example, the authentication module 232 may receive a voice sample, or data extracted from a voice sample, from the electronic device 100 via the communication link between the base station 200 and the electronic device 100. Features from the audio input received at operation 435 may then be compared to the features in the voice sample from electronic device 100 to determine whether the user is authenticated.

The base station 200 may then monitor the audio input to determine whether there is audio input for the electronic device 100. If, at operation 445, there is audio input for the electronic device, then control passes to operation 450 and the base station 200 forwards the audio input to the electronic device 100. At operation 455 the electronic device 100 processes the audio input. By way of example, the audio input include a request to a personal assistant (e.g., "Please find an restaurant nearby") or the like. The electronic device 100 processes the request (e.g., by locating nearby restaurants) and forwards (operation 460) a reply to the base station 200.

At operation 465 the base station 200 receives the reply from the electronic device 100 and at operation 470 the base station 200 presents the reply on the audio interface.

Thus, the operations of FIG. 4 enable a user to interact with the electronic device 100 via the audio interface while the electronic device is coupled to the charging station 270. In some examples the base station 200 may be adapted to provide interaction with multiple electronic devices 100. Thus, when a second or subsequent electronic device 100 is detected by the base station operations 410-440 may be repeated with the second or subsequent electronic device 100 to establish an association between an audio input and an electronic device 100 such that the base station 200 can direct an audio input to the appropriate electronic device.

In a second example the base station 200 comprises an RF transceiver which provides a connection to a network such as network 340 depicted in FIG. 3, and may or may not include a charging station 270. In such examples, when the base station 200 detects an electronic device 100 the base station 200 may establish a communication link with the electronic device and activate the audio interface to receive audio input. The electronic device 100 such as an earpiece 100B depicted in FIG. 2 may then be placed into a low-power state and the base station 200 may provide services which were previously provided by the electronic device 100B via the audio interface of the base station while the electronic device is in a low-power state.

Figure 5:
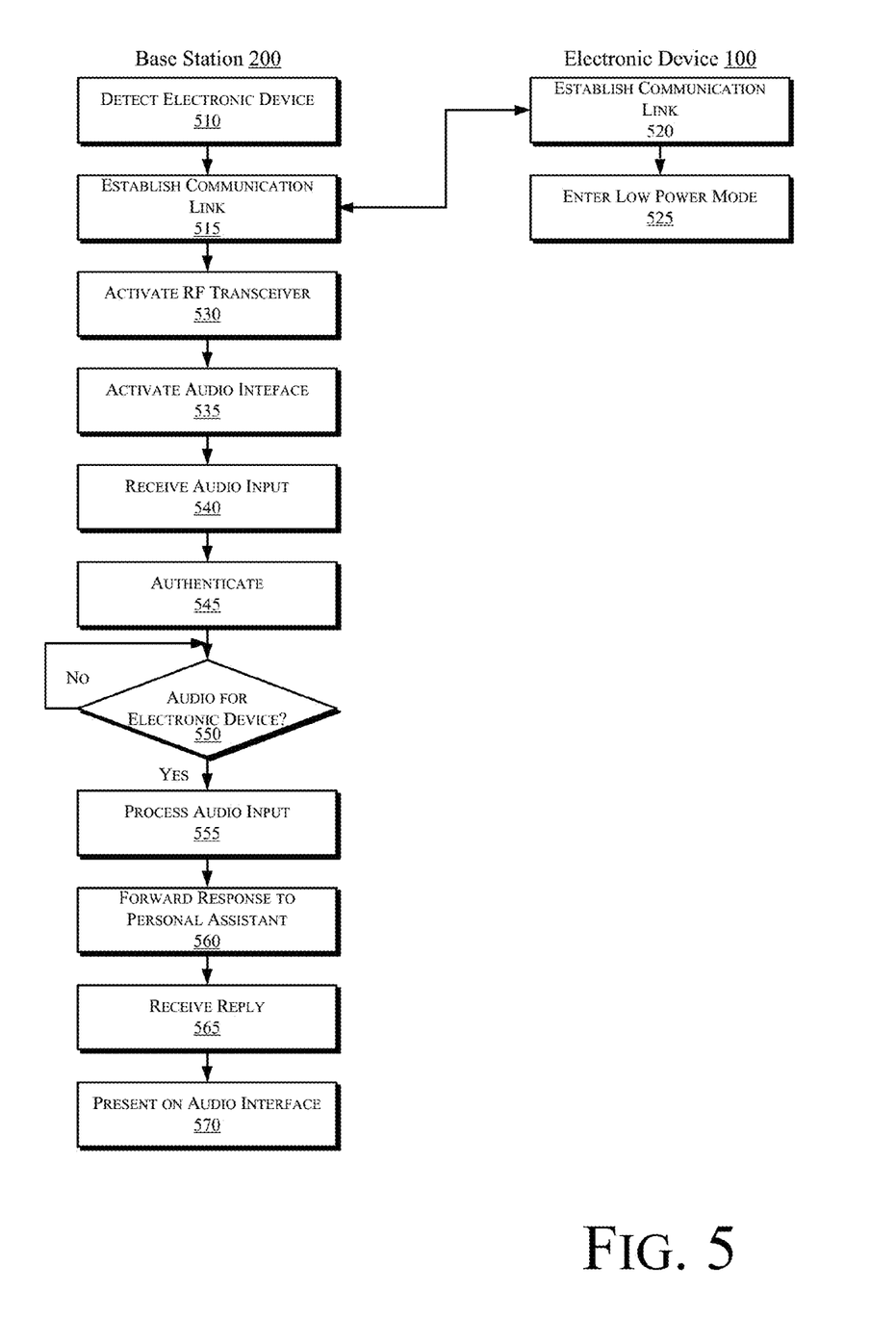

Referring to FIG. 5 at operation 510 the base station 200 detects an electronic device 100 within range of the base station 200. For example, in some examples the device detector 230 may detect a wireless beacon signal transmitted by electronic device 100. At operation 515 the base station 200 establishes a communication link with electronic device 100, and at operation 520 the electronic device 100 performs operations necessary to establish the communication link. For example, the communication link between base station 200 and electronic device 100 may be established via a wireless communication channel, e.g., a Bluetooth link or the like. At operation 525 the electronic device 100 may enter a low-power state.

At operation 530 base station 200 activates the RF transceiver 220, and at operation 535 the base station 430 activates the audio interface of the I/O interface(s) 226. At operation 540 the audio interface receives an audio input. For example, a user of the electronic device may place the electronic device 100 in the charging station and may begin speaking. The audio interface receives the audio input from the user.

At operation 545 the base station 200 authenticates the audio input. For example, the authentication module 232 may implement one or more routines to authenticate the audio input. In a first example, the authentication module 232 may obtain an identifier associated with the electronic device 100 and then may compare a characteristic of the audio input received in operation 540 with a corresponding characteristic of a pre-recorded audio input. For example, the base station 200 may implement a registration process in which a user of an electronic device may input a key phrase (e.g., "Hello Jarvis") to the audio interface. Authentication module 232 may then invoke the services of a voice recognition algorithm to extract and characterize one or more features (e.g., mel-frequency cepstral coefficients) of a voice signal. The extracted features may be stored in association with an identifier of the electronic device 100 in memory 240. Features from the audio input received at operation 540 may then be compared to the features stored in memory to determine whether the user is authenticated.

In another example the authentication module 232 obtains a voice sample from the electronic device 100 and matches the voice sample from the electronic device 100 to the audio input received at operation 540 to authenticate the user. For example, the authentication module 232 may receive a voice sample, or data extracted from a voice sample, from the electronic device 100 via the communication link between the base station 200 and the electronic device 100. Features from the audio input received at operation 540 may then be compared to the features in the voice sample from electronic device 100 to determine whether the user is authenticated.

The base station 200 may then monitor the audio input to determine whether there is audio input for the electronic device 100. If, at operation 550, there is audio input for the electronic device, then control passes to operation 555 and the base station 200 processes the audio input. By way of example, the audio input include a request to a personal assistant (e.g., "Please find an restaurant nearby") or the like. The personal assistant manager 244 may then forward (operation 560) the request to a personal assistant 142/178, which processes the request (e.g., by locating nearby restaurants) and forwards a reply to the base station 200.

At operation 565 the base station 200 receives the reply from the personal assistant 142/178 and at operation 570 the base station 200 presents the reply on the audio interface.

Thus, referring to FIG. 3, the operations of FIG. 5 enable a user to interact with an electronic device 100A via the audio interface on the base station 200 while the electronic device 100B is in a low-power state. In some examples the base station 200 may be adapted to provide interaction with multiple electronic devices 100A. Thus, when a second or subsequent electronic device 100B is detected by the base station operations 510-545 may be repeated with the second or subsequent electronic device 100 to establish an association between an audio input and an electronic device 100 such that the base station 200 can direct an audio input to the appropriate electronic device.

Figure 6:
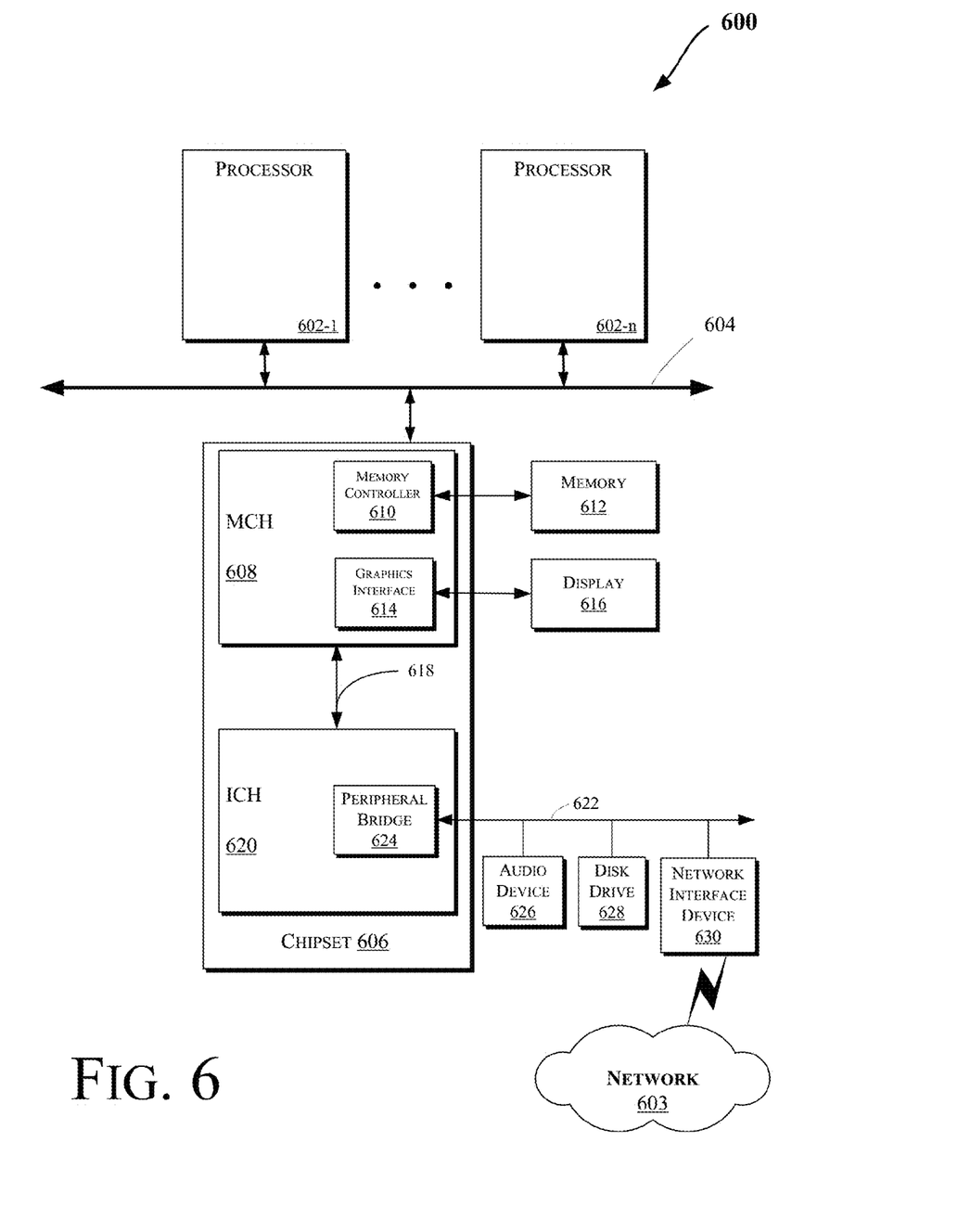
FIGS. 6-10 are schematic illustrations of electronic devices which may be adapted to implement an intelligent base station for electronic devices in accordance with some examples.

As described above, in some examples the electronic device may be embodied as a computer system. FIG. 6 illustrates a block diagram of a computing system 600 in accordance with an example. The computing system 600 may include one or more central processing unit(s) 602 or processors that communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)). Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors. In an example, one or more of the processors 602 may be the same or similar to the processors 102 of FIG. 1. For example, one or more of the processors 602 may include the control unit 124 discussed with reference to FIG. 1 or processor 224 of FIG. 2. Also, the operations discussed with reference to FIGS. 4-5 may be performed by one or more components of the system 600.

A chipset 606 may also communicate with the interconnection network 604. The chipset 606 may include a memory control hub (MCH) 608. The MCH 608 may include a memory controller 610 that communicates with a memory 612. The memory 612 may store data, including sequences of instructions, that may be executed by the processor 602, or any other device included in the computing system 600. In one example, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 604, such as multiple processor(s) and/or multiple system memories.

The MCH 608 may also include a graphics interface 614 that communicates with a display device 616. In one example, the graphics interface 614 may communicate with the display device 616 via an accelerated graphics port (AGP). In an example, the display 616 (such as a flat panel display) may communicate with the graphics interface 614 through, for example, a signal converter that translates a digital representation of an image stored in a storage device such as video memory or system memory into display signals that are interpreted and displayed by the display 616. The display signals produced by the display device may pass through various control devices before being interpreted by and subsequently displayed on the display 616.

A hub interface 618 may allow the MCH 608 and an input/output control hub (ICH) 620 to communicate. The ICH 620 may provide an interface to I/O device(s) that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the processor 602 and peripheral devices. Other types of topologies may be utilized. Also, multiple buses may communicate with the ICH 620, e.g., through multiple bridges or controllers. Moreover, other peripherals in communication with the ICH 620 may include, in various examples, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and a network interface device 630 (which is in communication with the computer network 603). Other devices may communicate via the bus 622. Also, various components (such as the network interface device 630) may communicate with the MCH 608 in some examples. In addition, the processor 602 and one or more other components discussed herein may be combined to form a single chip (e.g., to provide a System on Chip (SOC)). Furthermore, the graphics accelerator 616 may be included within the MCH 608 in other examples.

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 7:
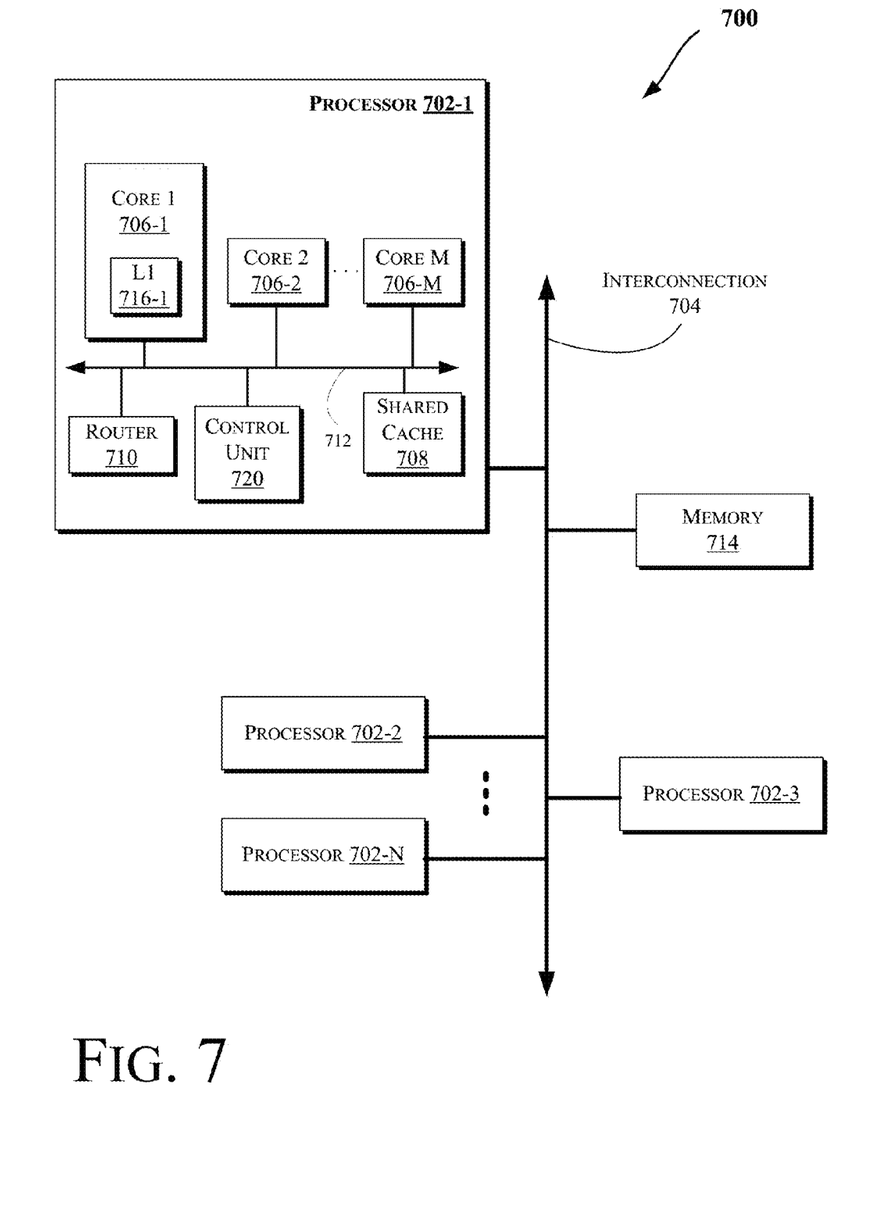

FIG. 7 illustrates a block diagram of a computing system 700, according to an example. The system 700 may include one or more processors 702-1 through 702-N (generally referred to herein as "processors 702" or "processor 702"). The processors 702 may communicate via an interconnection network or bus 704. Each processor may include various components some of which are only discussed with reference to processor 702-1 for clarity. Accordingly, each of the remaining processors 702-2 through 702-N may include the same or similar components discussed with reference to the processor 702-1.

In an example, the processor 702-1 may include one or more processor cores 706-1 through 706-M (referred to herein as "cores 706" or more generally as "core 706"), a shared cache 708, a router 710, and/or a processor control logic or unit 720. The processor cores 706 may be implemented on a single integrated circuit (IC) chip. Moreover, the chip may include one or more shared and/or private caches (such as cache 708), buses or interconnections (such as a bus or interconnection network 712), memory controllers, or other components.

In one example, the router 710 may be used to communicate between various components of the processor 702-1 and/or system 700. Moreover, the processor 702-1 may include more than one router 710. Furthermore, the multitude of routers 710 may be in communication to enable data routing between various components inside or outside of the processor 702-1.

The shared cache 708 may store data (e.g., including instructions) that are utilized by one or more components of the processor 702-1, such as the cores 706. For example, the shared cache 708 may locally cache data stored in a memory 714 for faster access by components of the processor 702. In an example, the cache 708 may include a mid-level cache (such as a level 2 (L2), a level 3 (L3), a level 4 (L4), or other levels of cache), a last level cache (LLC), and/or combinations thereof. Moreover, various components of the processor 702-1 may communicate with the shared cache 708 directly, through a bus (e.g., the bus 712), and/or a memory controller or hub. As shown in FIG. 7, in some examples, one or more of the cores 706 may include a level 1 (L1) cache 716-1 (generally referred to herein as "L1 cache 716").

Figure 8:
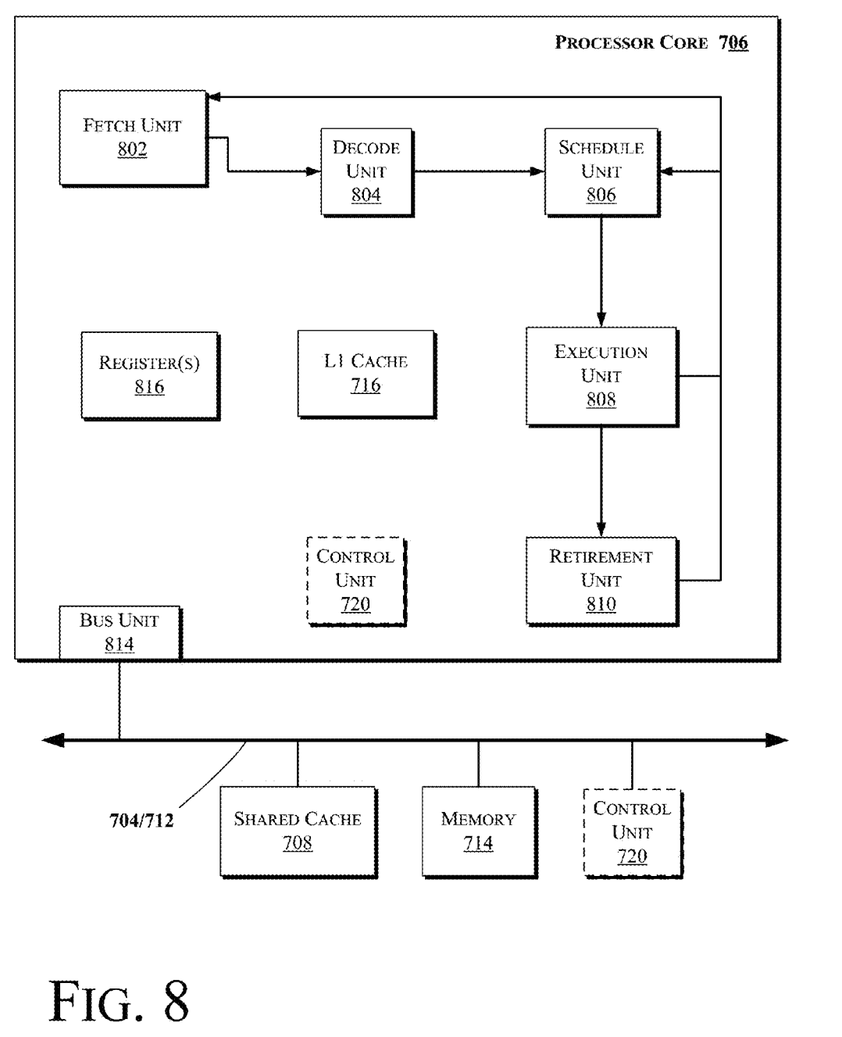

FIG. 8 illustrates a block diagram of portions of a processor core 706 and other components of a computing system, according to an example. In one example, the arrows shown in FIG. 8 illustrate the flow direction of instructions through the core 706. One or more processor cores (such as the processor core 706) may be implemented on a single integrated circuit chip (or die) such as discussed with reference to FIG. 7. Moreover, the chip may include one or more shared and/or private caches (e.g., cache 708 of FIG. 7), interconnections (e.g., interconnections 704 and/or 112 of FIG. 7), control units, memory controllers, or other components.

As illustrated in FIG. 8, the processor core 706 may include a fetch unit 802 to fetch instructions (including instructions with conditional branches) for execution by the core 706. The instructions may be fetched from any storage devices such as the memory 714. The core 706 may also include a decode unit 804 to decode the fetched instruction. For instance, the decode unit 804 may decode the fetched instruction into a plurality of uops (micro-operations).

Additionally, the core 706 may include a schedule unit 806. The schedule unit 806 may perform various operations associated with storing decoded instructions (e.g., received from the decode unit 804) until the instructions are ready for dispatch, e.g., until all source values of a decoded instruction become available. In one example, the schedule unit 806 may schedule and/or issue (or dispatch) decoded instructions to an execution unit 808 for execution. The execution unit 808 may execute the dispatched instructions after they are decoded (e.g., by the decode unit 804) and dispatched (e.g., by the schedule unit 806). In an example, the execution unit 808 may include more than one execution unit. The execution unit 808 may also perform various arithmetic operations such as addition, subtraction, multiplication, and/or division, and may include one or more an arithmetic logic units (ALUs). In an example, a co-processor (not shown) may perform various arithmetic operations in conjunction with the execution unit 808.

Further, the execution unit 808 may execute instructions out-of-order. Hence, the processor core 706 may be an out-of-order processor core in one example. The core 706 may also include a retirement unit 810. The retirement unit 810 may retire executed instructions after they are committed. In an example, retirement of the executed instructions may result in processor state being committed from the execution of the instructions, physical registers used by the instructions being de-allocated, etc.

The core 706 may also include a bus unit 714 to enable communication between components of the processor core 706 and other components (such as the components discussed with reference to FIG. 8) via one or more buses (e.g., buses 804 and/or 812). The core 706 may also include one or more registers 816 to store data accessed by various components of the core 706 (such as values related to power consumption state settings).

Furthermore, even though FIG. 7 illustrates the control unit 720 to be coupled to the core 706 via interconnect 812, in various examples the control unit 720 may be located elsewhere such as inside the core 706, coupled to the core via bus 704, etc.

Figure 9:
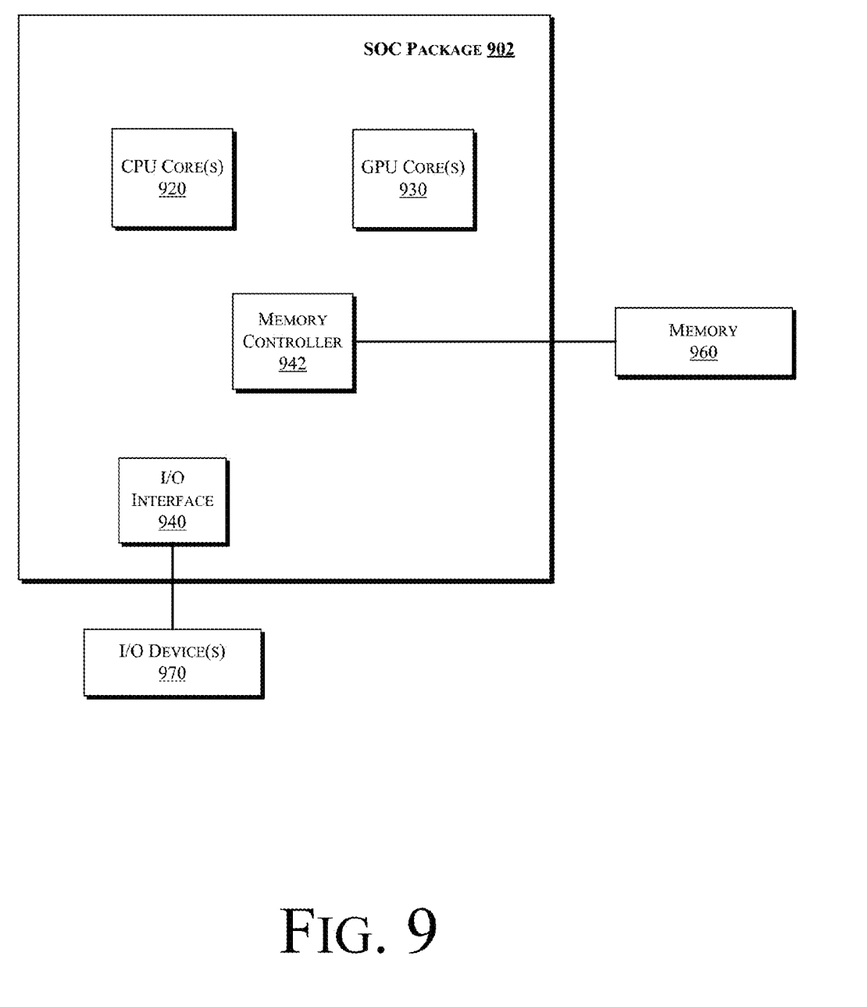

In some examples, one or more of the components discussed herein can be embodied as a System On Chip (SOC) device. FIG. 9 illustrates a block diagram of an SOC package in accordance with an example. As illustrated in FIG. 9, SOC 902 includes one or more processor cores 920, one or more graphics processor cores 930, an Input/Output (I/O) interface 940, and a memory controller 942. Various components of the SOC package 902 may be coupled to an interconnect or bus such as discussed herein with reference to the other figures. Also, the SOC package 902 may include more or less components, such as those discussed herein with reference to the other figures. Further, each component of the SOC package 902 may include one or more other components, e.g., as discussed with reference to the other figures herein. In one example, SOC package 902 (and its components) is provided on one or more Integrated Circuit (IC) die, e.g., which are packaged into a single semiconductor device.

As illustrated in FIG. 9, SOC package 902 is coupled to a memory 960 (which may be similar to or the same as memory discussed herein with reference to the other figures) via the memory controller 942. In an example, the memory 960 (or a portion of it) can be integrated on the SOC package 902.

The I/O interface 940 may be coupled to one or more I/O devices 970, e.g., via an interconnect and/or bus such as discussed herein with reference to other figures. I/O device(s) 970 may include one or more of a keyboard, a mouse, a touchpad, a display, an image/video capture device (such as a camera or camcorder/video recorder), a touch surface, a speaker, or the like.

Figure 10:
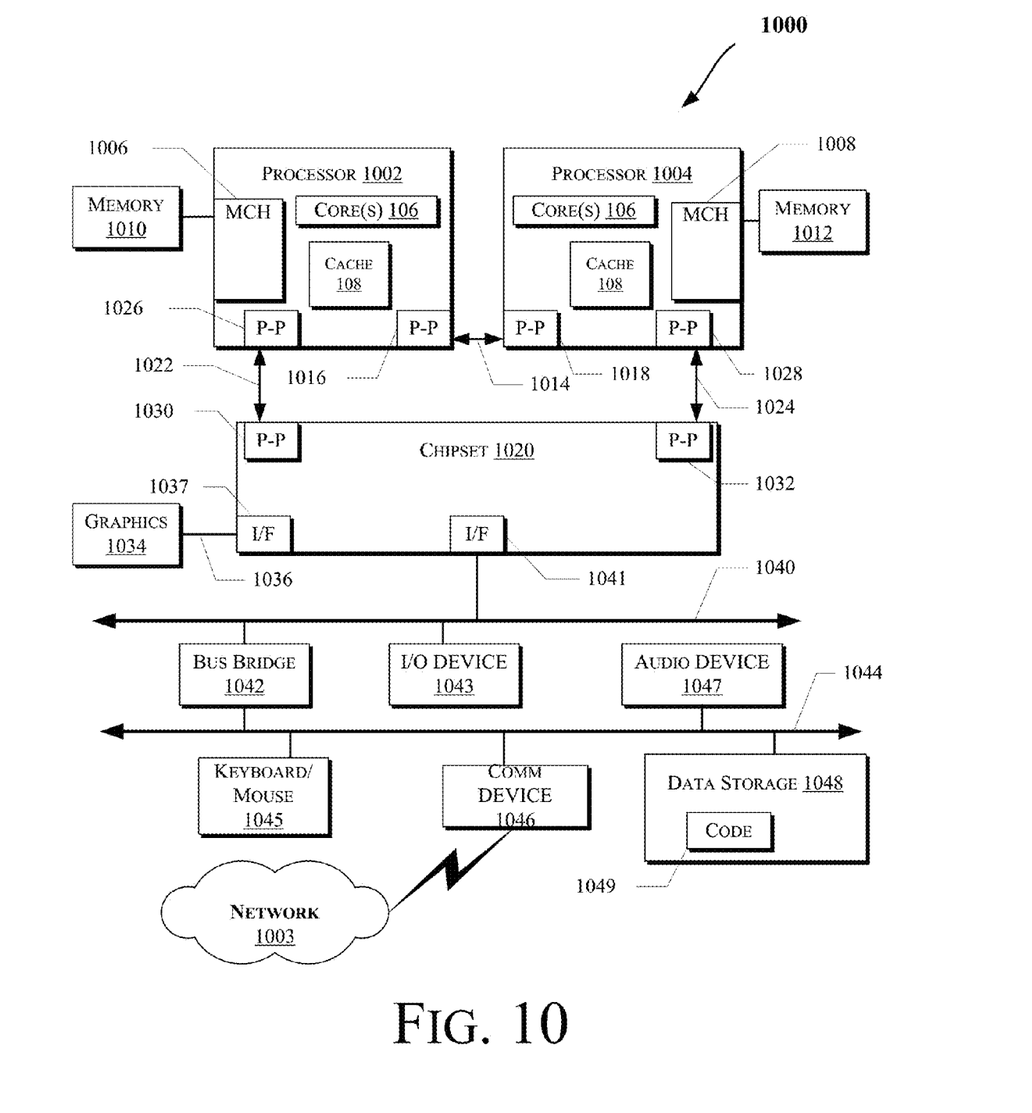

FIG. 10 illustrates a computing system 1000 that is arranged in a point-to-point (PtP) configuration, according to an example. In particular, FIG. 10 shows a system where processors, memory, and input/output devices are interconnected by a number of point-to-point interfaces. The operations discussed with reference to FIG. 2 may be performed by one or more components of the system 1000.

As illustrated in FIG. 10, the system 1000 may include several processors, of which only two, processors 1002 and 1004 are shown for clarity. The processors 1002 and 1004 may each include a local memory controller hub (MCH) 1006 and 1008 to enable communication with memories 1010 and 1012. MCH 1006 and 1008 may include the memory controller 120 and/or logic 125 of FIG. 1 in some examples.

In an example, the processors 1002 and 1004 may be one of the processors 702 discussed with reference to FIG. 7. The processors 1002 and 1004 may exchange data via a point-to-point (PtP) interface 1014 using PtP interface circuits 1016 and 1018, respectively. Also, the processors 1002 and 1004 may each exchange data with a chipset 1020 via individual PtP interfaces 1022 and 1024 using point-to-point interface circuits 1026, 1028, 1030, and 1032. The chipset 1020 may further exchange data with a high-performance graphics circuit 1034 via a high-performance graphics interface 1036, e.g., using a PtP interface circuit 1037.

As shown in FIG. 10, one or more of the cores 106 and/or cache 108 of FIG. 1 may be located within the processors 1004. Other examples, however, may exist in other circuits, logic units, or devices within the system 1000 of FIG. 10. Furthermore, other examples may be distributed throughout several circuits, logic units, or devices illustrated in FIG. 10.

The chipset 1020 may communicate with a bus 1040 using a PtP interface circuit 1041. The bus 1040 may have one or more devices that communicate with it, such as a bus bridge 1042 and I/O devices 1043. Via a bus 1044, the bus bridge 1043 may communicate with other devices such as a keyboard/mouse 1045, communication devices 1046 (such as modems, network interface devices, or other communication devices that may communicate with the computer network 1003), audio I/O device, and/or a data storage device 1048. The data storage device 1048 (which may be a hard disk drive or a NAND flash based solid state drive) may store code 1049 that may be executed by the processors 1004.

The following pertain to further examples.

Example 1 is a base station for an electronic device, comprising a charging station, an audio interface, and logic, at least partially including hardware logic, configured to detect a first electronic device within a geographic region proximate the base station and in response to detecting the first electronic device, to establish a communication link with the first electronic device via a wireless communication channel, and activate the audio interface to receive audio input.

In Example 2, the subject matter of Example 1 can optionally include logic, at least partially including hardware logic, which, in response to detecting the first electronic device within a geographic region proximate the base station, activates the charging station.

In Example 3, the subject matter of any one of Examples 1-2 can optionally include logic, at least partially including hardware logic, to receive an audio input at the audio interface, and in response to a determination that audio input is associated with the first electronic device, to forward the audio input to the first electronic device.

In Example 4, the subject matter of any one of Examples 1-3 can optionally include logic, at least partially including hardware logic, to authenticate the audio input.

In Example 5, the subject matter of any one of Examples 1-4 can optionally include logic, at least partially including hardware logic, to obtain an identifier associated with the first electronic device and match the audio input with a prerecorded audio signal associated with the first electronic device.

In Example 6, the subject matter of any one of Examples 1-5 can optionally include logic further configured to logic, at least partially including hardware logic, to obtain a voice sample from the first electronic device, and match the audio input with the voice sample received from the first electronic device.

In Example 7, the subject matter of any one of Examples 1-6 can optionally include logic further configured to logic, at least partially including hardware logic, to receive a reply from the first electronic device over the wireless communication channel, and present the response from the first electronic device on the audio interface.

In Example 8, the subject matter of any one of Examples 1-7 can optionally include logic further configured to logic, at least partially including hardware logic, to detect a second electronic device within a geographic region proximate the base station, and in response to detecting the second electronic device, to establish a communication link with the second electronic device via the wireless communication channel, receive an audio input in the audio interface, and in response to a determination that audio input is associated with the second electronic device, to forward the audio input to the second electronic device.

In Example 9, the subject matter of any one of Examples 1-8 can optionally include logic further configured to logic, at least partially including hardware logic, to authenticate the audio input.

In Example 10, the subject matter of any one of Examples 1-9 can optionally include logic further configured to logic, at least partially including hardware logic, to obtain an identifier associated with the second electronic device; and match the audio input with a prerecorded audio signal associated with the second electronic device.

In Example 11, the subject matter of any one of Examples 1-10 can optionally include logic further configured to logic, at least partially including hardware logic, to obtain a voice sample from the second electronic device and match the audio input with the voice sample received from the second electronic device.

In Example 12, the subject matter of any one of Examples 1-11 can optionally include logic further configured to logic, at least partially including hardware logic, to receive a reply from the second electronic device over the wireless communication channel, and present the response from the second electronic device on the audio interface.

Example 13 is a base station for an electronic device, comprising an RF transceiver, an audio interface; and logic, at least partially including hardware logic, configured to detect a first electronic device within a geographic region proximate the base station and in response to detecting the first electronic device, to establish a communication link with the first electronic device via a wireless communication channel activate the audio interface to receive audio input.

In Example 14, the subject matter of Example 13 can optionally include logic, at least partially including hardware logic, to receive an audio input at the audio interface, and in response to a determination that audio input is associated with the first electronic device, to forward the audio input to the first electronic device.

In Example 15, the subject matter of any one of Examples 13-14 can optionally include logic, at least partially including hardware logic, to authenticate the audio input.

In Example 16, the subject matter of any one of Examples 13-15 can optionally include logic, at least partially including hardware logic, to obtain an identifier associated with the first electronic device and match the audio input with a prerecorded audio signal associated with the first electronic device.

In Example 17, the subject matter of any one of Examples 13-16 can optionally include logic further configured to logic, at least partially including hardware logic, to obtain a voice sample from the first electronic device, and match the audio input with the voice sample received from the first electronic device.

In Example 18, the subject matter of any one of Examples 13-17 can optionally include logic further configured to logic, at least partially including hardware logic, to receive a reply from the first electronic device over the wireless communication channel, and present the response from the first electronic device on the audio interface.

In Example 19, the subject matter of any one of Examples 13-18 can optionally include logic further configured to logic, at least partially including hardware logic, to detect a second electronic device within a geographic region proximate the base station, and in response to detecting the second electronic device, to establish a communication link with the second electronic device via the wireless communication channel, receive an audio input in the audio interface, and in response to a determination that audio input is associated with the second electronic device, to forward the audio input to the second electronic device.

In Example 20, the subject matter of any one of Examples 13-19 can optionally include logic further configured to logic, at least partially including hardware logic, to authenticate the audio input.

In Example 21, the subject matter of any one of Examples 13-20 can optionally include logic further configured to logic, at least partially including hardware logic, to obtain an identifier associated with the second electronic device; and match the audio input with a prerecorded audio signal associated with the second electronic device.

In Example 22, the subject matter of any one of Examples 13-21 can optionally include logic further configured to logic, at least partially including hardware logic, to obtain a voice sample from the second electronic device and match the audio input with the voice sample received from the second electronic device.

In Example 23, the subject matter of any one of Examples 13-22 can optionally include logic further configured to logic, at least partially including hardware logic, to receive a reply from the second electronic device over the wireless communication channel, and present the response from the second electronic device on the audio interface.

In Example 24, the subject matter of any one of Examples 13-22 can optionally include logic further configured to logic, at least partially including hardware logic, to receive a reply from the second electronic device over the wireless communication channel, and present the response from the second electronic device on the audio interface.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A base station for an electronic device, comprising:
   a charging station;
   an audio interface; and
   logic, at least partially including hardware logic, configured to:
      detect a first electronic device within a geographic region proximate the base station; and
      in response to detecting the first electronic device, to:
         establish a communication link with the first electronic device via a wireless communication channel;
         activate the audio interface to receive audio input;
         receive an audio input at the audio interface;
         in response to a determination that audio input is associated with the first electronic device, to forward the audio input to the first electronic device
         authenticate the audio input;
         obtain an identifier associated with the first electronic device; and
      match the audio input with a prerecorded audio signal associated with the first electronic device.

2. The base station of claim 1, further comprising logic, at least partially including hardware logic, which, in response to detecting the first electronic device within a geographic region proximate the base station, activates the charging station.

3. The base station of claim 1, wherein the logic to authenticate the audio signal further comprises logic, at least partially including hardware logic, to:
   obtain a voice sample from the first electronic device; and match the audio input with the voice sample received from the first electronic device.

4. The base station of claim 1, further comprising logic to:
receive a reply from the first electronic device over the wireless communication channel; and
present the response from the first electronic device on the audio interface.

5. A base station for an electronic device, comprising:
a charging station;
an audio interface; and
logic, at least partially including hardware logic, configured to:
detect a second electronic device within a geographic region proximate the base station; and
in response to detecting the second electronic device, to:
establish a communication link with the second electronic device via the wireless communication channel;
receive an audio input in the audio interface; and
in response to a determination that audio input is associated with the second electronic device, to forward the audio input to the second electronic device.

6. The base station of claim 5, further comprising logic, at least partially including hardware logic, to:
authenticate the audio input.

7. The base station of claim 6, wherein the logic to authenticate the audio input further comprises logic, at least partially including hardware logic, to:
obtain an identifier associated with the second electronic device; and
match the audio input with a prerecorded audio signal associated with the second electronic device.

8. The base station of claim 6, wherein the logic to authenticate the audio signal further comprises logic, at least partially including hardware logic, to:
obtain a voice sample from the second electronic device; and
match the audio input with the voice sample received from the second electronic device.

9. The base station of claim 6, further comprising logic to:
receive a reply from the second electronic device over the wireless communication channel; and
present the response from the second electronic device on the audio interface.

10. A base station for an electronic device, comprising:
an RF transceiver;
an audio interface; and
logic, at least partially including hardware logic, configured to:
detect a first electronic device within a geographic region proximate the base station; and
in response to detecting the first electronic device, to:
establish a communication link with the first electronic device via a wireless communication channel;
activate the audio interface to receive audio input;
receive an audio input at the audio interface;
in response to a determination that audio input is associated with the first electronic device, to forward the audio input to the first electronic device
authenticate the audio input;
obtain an identifier associated with the first electronic device; and match the audio input with a prerecorded audio signal associated with the first electronic device.

11. The base station of claim 10, further comprising logic, at least partially including hardware logic, to:
receive an audio input at the audio interface; and
in response to a determination that audio input is associated with the first electronic device, to forward the audio input to the first electronic device.

12. The base station of claim 11, further comprising logic to:
receive a reply from the first electronic device over the wireless communication channel; and
present the response from the first electronic device on the audio interface.

13. The base station of claim 10, further comprising:
a charging station; and
logic, at least partially including hardware logic, which, in response to detecting the first electronic device within a geographic region proximate the base station, activates a charging station.

14. A base station for an electronic device, comprising:
an RF transceiver;
an audio interface; and
logic, at least partially including hardware logic, configured to:
detect a second electronic device within a geographic region proximate the base station; and
in response to detecting the second electronic device, to:
establish a communication link with the second electronic device via the wireless communication channel;
receive an audio input in the audio interface; and
in response to a determination that audio input is associated with the first electronic device, to forward the audio input to the second electronic device.

15. The base station of claim 14, further comprising logic, at least partially including hardware logic, to:
authenticate the audio input.

16. The base station of claim 15, wherein the logic to authenticate the audio signal further comprises logic, at least partially including hardware logic, to:
obtain a voice sample from the second electronic device; and
match the audio input with the voice sample received from the second electronic device.

17. The base station of claim 15, wherein the logic to authenticate the audio input further comprises logic, at least partially including hardware logic, to:
obtain an identifier associated with the second electronic device; and
match the audio input with a prerecorded audio signal associated with the second electronic device.

18. The base station of claim 14, further comprising logic to:
receive a reply from the second electronic device over the wireless communication channel; and
present the response from the second electronic device on the audio interface.

* * * * *